Oct. 27, 1942.    H. F. IRVING    2,299,988
PROCESS OF TREATING RUBBER AND LIKE SUBSTANCES
Filed March 27, 1939    3 Sheets-Sheet 1

Oct. 27, 1942. H. F. IRVING 2,299,988
PROCESS OF TREATING RUBBER AND LIKE SUBSTANCES
Filed March 27, 1939 3 Sheets-Sheet 2

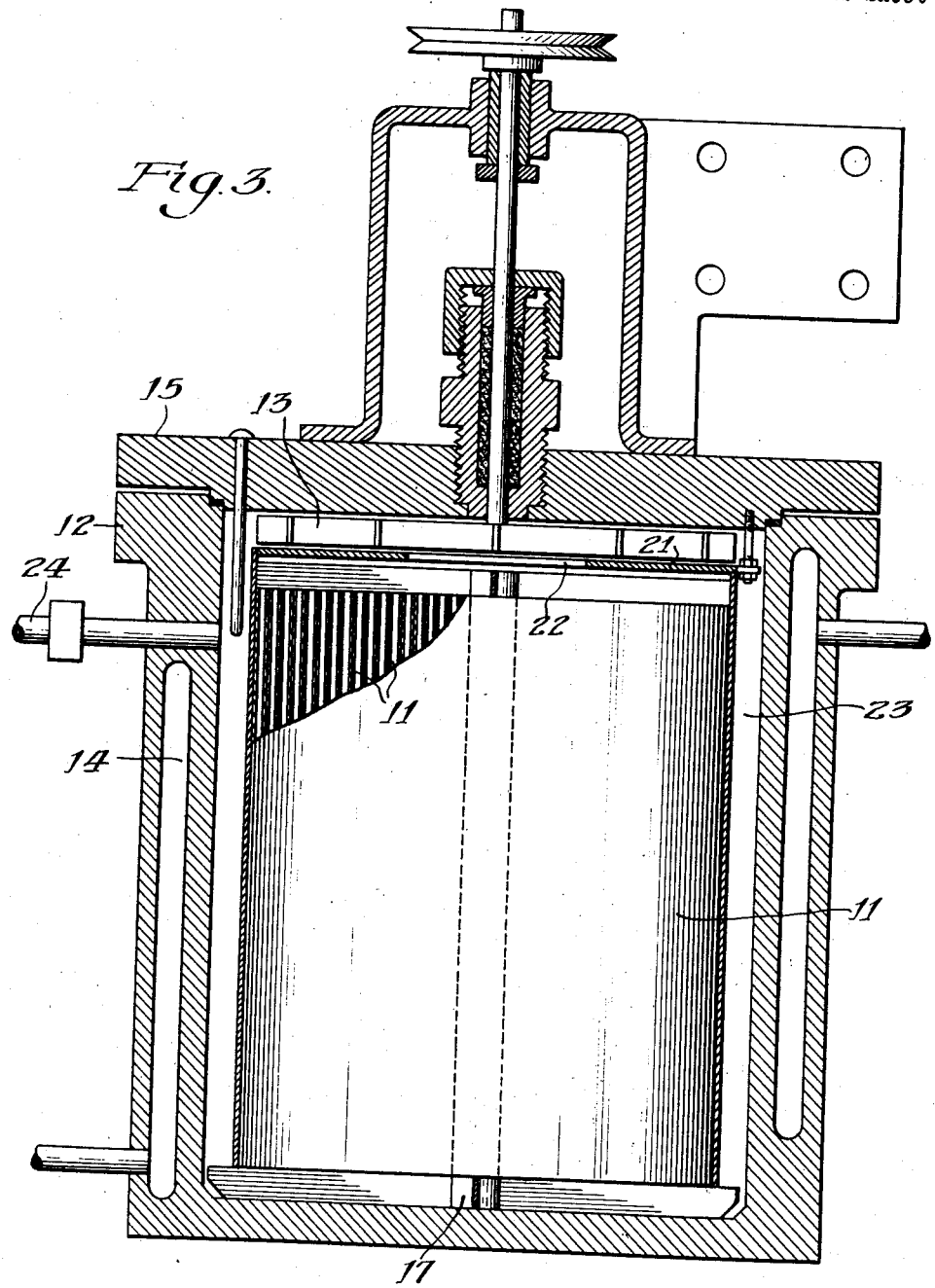

Patented Oct. 27, 1942

2,299,988

UNITED STATES PATENT OFFICE 2,299,988

PROCESS OF TREATING RUBBER AND LIKE SUBSTANCES

Henry F. Irving, Gary, Ind., assignor to Marbon Corporation, Gary, Ind., a corporation of Delaware Application March 27, 1939, Serial No. 264,406

2 Claims. (Cl. 260—771)

The invention relates to the treatment of rubber and like substances. More particularly the invention relates to a method of preparing crimped sheet rubber for exothermic reactions and to improvements in reactions carried out with the prepared sheet.

The reactions of solid masses of rubber and like materials with fluids such as liquids and gases generally require a long period of time before the reaction is completed for the entire mass and often the reaction product is non-uniform. Hitherto various solid materials such as rubber have been milled and calendered into sheets and then made into bundles in which the sheets are spaced apart by porous spacers or some other means, and then the sheet material reacted by passing reagents between the spaced sheet material. In Peachey British Patent 218,715, of 1923, the rubber or other articles in sheet form is vulcanized by passing the gases or vapors between the layers of the material while batched up on a spool having perforated ends, the convolutions of the material to be treated being spaced apart by textile or like porous material in sheet form or by means of tubes or rods of metal or wood in the form of a grill.

In an application in which I am a joint inventor, Serial No. 100,534, filed September 12, 1936, now Patent 2,139,922, of December 13, 1938, and also in its continuation application Serial No. 245,145, filed Dec. 12, 1938, there is disclosed a method of reacting rubber in which the rubber is reacted in the form of a corrugated composite sheet wound on itself to form a roll, having spaced passageways throughout the roll formed by the corrugations.

In carrrying out reactions with bundles of milled and calendered sheet rubber, I have observed that the entire bundle seems to become compressed during the reaction, the spaces between the sheets diminishing and sometimes even entirely closing and the entire bundle shrinking in size, so that the space between the outer portion of the bundle and the sides of the reactor has greatly increased. This shrinking and compression of the bundle makes it extremely difficult to circulate fluid through the interior portions of the bundle and easy to circulate it between the bundle and the walls of the reactor, thus causing non-uniformity in the reaction product.

In accordance with this invention I pre-shrink the rubber sheets prior to the reaction. This may be accomplished by simply heating the sheets when they are not being subjected to external stresses. In this manner strain in the sheets induced by milling and calendering are relieved. The sheets shrink and come to a state of equilibrium in which they will not further shrink. When such sheets are wound into a roll in which the convolutions are spaced apart by suitable means and the material of the roll reacted, the heat produced by the reaction will no longer cause compressive forces to be set up. The openings between the sheets remain in their original dimensions. When the bundle is placed in a reactor so that its outer portion is close against the sides of the reactor the space between the reactor and the outer portion remains substantially constant, the resistance to the flow of fluid reagent through the bundle and through the reactor therefore remains substantially uniform, with the result that all portions of the bundle become completely reacted at about the same time.

Other objects and advantages of the invention will become apparent as the following detailed description progresses, reference being had to the accompanying drawings in which Fig. 1 is a diagrammatic side elevation of an apparatus for converting sheets under strain into bundles of unstrained sheet material in accordance with the invention.

Fig. 3 is an elevation of an apparatus for carrying out the reaction process with bundles such as shown in Figs. 1 and 2.

Figure 1:
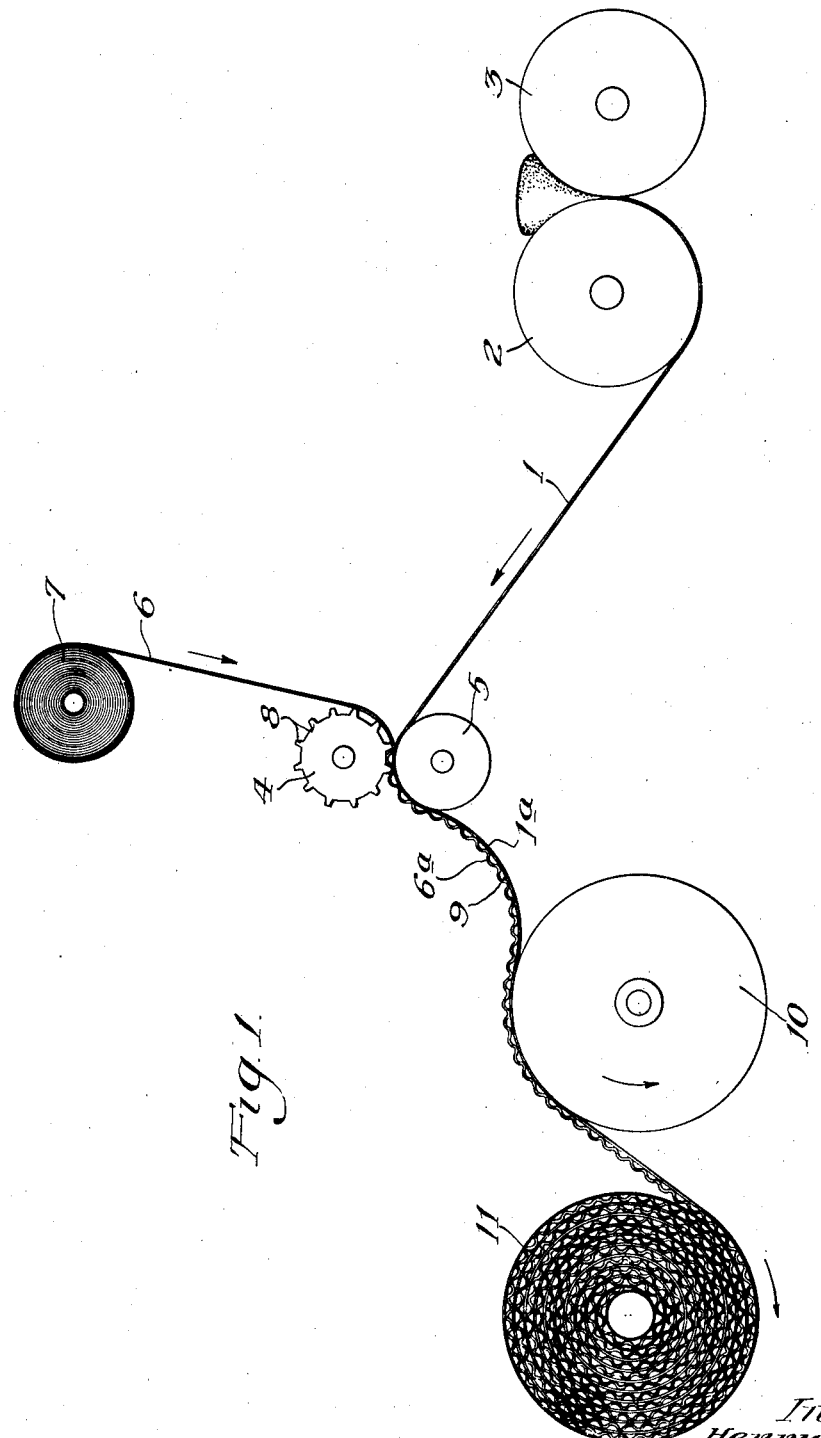

Referring to Fig. 1 in which a preferred embodiment of the invention is shown, reference character 1 designates a sheet of calendered rubber as it emerges from the calender rolls 2 and 3. This calendered sheet 1 is stretched and is passed in its stretched state between rolls 4 and 5. Rolls 4 and 5 and calender rolls 2 and 3 are rotated at a constant speed, such that the calendered sheet 1 is maintained in its stretched condition as it passes between rolls 4 and 5. Another calendered sheet 6 which is maintained in a substantially unstretched condition is supplied from roll 7 and also passes between rolls 4 and 5. Roll 5 is a smooth roller and roll 4 has projections around its surface so that when the sheets 1 and 6 are passed between the two rollers the sheet 6 is pressed by means of the projections 8 against the sheet 1 at spaced intervals, thereby forming a composite sheet 9 consisting of a crimped or corrugated sheet 6a secured to the flat sheet 1a. As the composite sheet 9 emerges from between the rollers 4 and 5 it is allowed to sag slightly in order to relieve tension. This may be accomplished by varying the speed of the roller 10. The roller 10 is heated by steam or other means and as the composite sheet 9 passes over its surface the composite sheet is heated and thus shrunk and relieved of the strains induced by the calendering and corrugating processes. The composite sheet thus preshrunk and relieved of strain is wound into a bundle or roll 11 in which the convolutes of the roll are spaced apart to permit passage of fluid reagent. The composite sheet is wound on itself until a roll of such size is formed that it will closely fit against the sides of the reactor vessel in which it is to be reacted as shown in Fig. 3. As soon as a roll of suitable size is obtained the roll 11 is placed in the reaction vessel 12 as shown in Fig. 3.

After the roll 11 is put in place in the reactor and the cover 15 securely bolted, hydrogen chloride gas or other exothermic reagent is admitted under pressure through inlet 24. The pressure is controlled to any desired amount by means of valves. A reaction quickly takes place evolving large quantities of heat which must be removed, otherwise the temperature within the rubber mass will rise so high that fusion and decomposition will take place, or will at least rise to such an extent and vary to such an extent that if it is not controlled the reaction product will be non-uniform and not of the predetermined characteristics. In order to control the temperature and maintain it within predetermined limits the blower or impeller 13 is started and cooling liquid is circulated through the jacket 14. The impeller circulates the gas down through the passage 23 where heat is removed by the cooling liquid circulating in jacket 14, and thence upwardly through the passages between the rubber on the roll core 17, and through aperture 22 in impeller plate 21 where it is recirculated by the impeller 13. As the speed of the reaction and the evolved heat diminishes the temperature of the circulating fluid in the jacket 14 may be increased by means not shown; as for example heating coils. The velocity of the circulating gases may also be varied as, for example, by varying the speed of the impeller.

Figure 2:
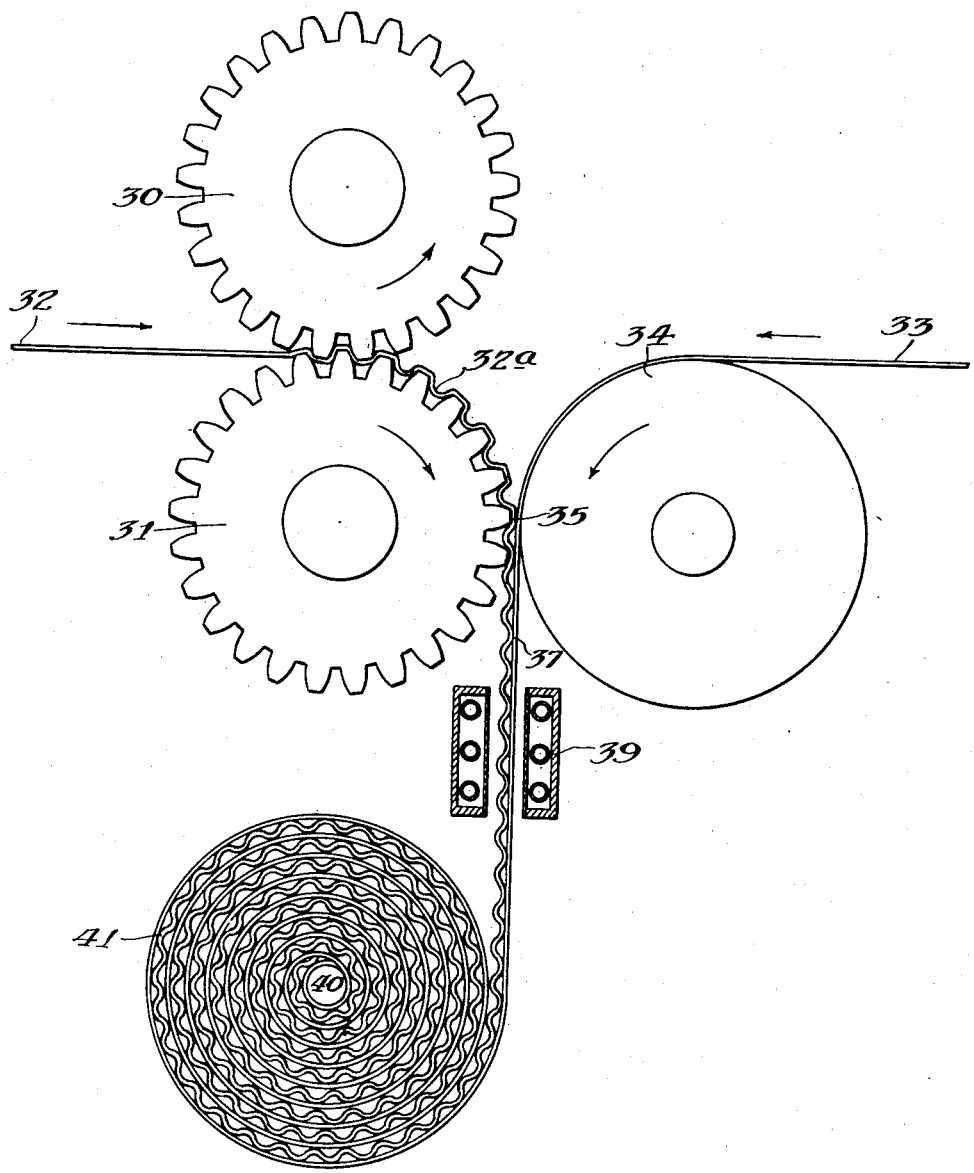
Fig. 2 is a diagrammatic elevation of a modified apparatus for converting sheets under strain into bundles of unstrained sheet material.

Instead of making the composite sheet by means of stretched and unstretched calendered sheets, the composite corrugated sheet may be made in the manner described in the aforementioned applications Serial No. 100,534, now Patent 2,139,922, and application Serial No. 245,145. In the process described in these applications, a rubber sheet is passed between two corrugating rolls 30 and 31 as shown in Fig. 2. Corrugating roll 30 is a gear bored and and cooled with cold water at about 60° F. Corrugated roll 31 is a gear bored for heating to 160° F. with hot water. The calendered sheet of rubber 32 is crimped by the cooperating teeth and because of the hot surface of the gear 31, the sheet adheres to the teeth of this gear and stays in its crimped condition until it is stripped therefrom. Another milled and calendered sheet 33 passes over the smooth roller 34 and is pressed at point 35 against the sheet 32. In this manner the composite corrugated sheet 37 is formed. The composite sheet 37 is led through the radiant heater 39 where it is heated sufficiently to cause it to shrink and become relieved of strain induced in it by milling, calendering and corrugating. The composite sheet 37 thus shrunk and relieved of strain is rolled around core 40 into a bundle 41 which may be reacted with fluid reagents, in the same manner as the corrugated bundle 11 illustrated in Fig. 1.

Instead of making a reactor roll formed of corrugated sheets the roll may be made in the manner illustrated in the Peachey British Patent 218,715, wherein spacers of porous material or grills of metal or wood may be used to form passageways between the convolutions of the sheet material in roll form.

Whatever method is used to place the sheet material in form suitable for reaction, it is essential that prior to reaction the sheet material be heated or otherwise treated to relieve it of unequal stresses, which, if not removed prior to reaction, cause shrinkage and compression of the sheets during the reaction with consequent non-uniformity of the product, as well as difficult and uneconomical carrying out of the process.

To more clearly set forth the practice in accordance with the invention and to more specifically point out the nature of the product and process contemplated thereby, several specific, illustrative examples are hereinafter set forth, it being understood that these examples illustrate several embodiments which have given satisfactory results and are not intended to restrict the invention thereto.

*Example I*

A composite corrugated sheet produced in any suitable manner from calendered rubber sheets of .015" thickness is passed over the heated roller 10 as it leaves the corrugating rolls 4 and 5. The roll 10 is heated with steam to a temperature between 140° and 180° F. At a speed of corrugation of about 7 feet per minute the composite sheet of rubber is maintained in contact with the roll about one tenth of a minute. The amount of heat so generated preshrinks the composite sheet prior to reaction. A roll or bundle made from such preshrunk composite sheet material had a weight prior to reaction of 202 lbs. A bundle of the same dimensions made from composite sheets which had not been preshrunk had a weight of 149 lbs. This indicates a shrinkage of approximately 35½%.

Reactions of hydrogen chloride with the rubber of these preshrunk sheets were completed quicker than with sheets which had not been preshrunk and the product was more uniformly reacted throughout the bundle.

*Example II*

Pale crepe rubber is milled and calendered into sheets of .015" thickness. One such sheet is passed between hot and cold corrugating rolls which crimp the rubber as shown in Fig. 2, another sheet is passed over smooth rolls in such a manner that it comes in contact with the hot crimped rubber as it follows around the hot corrugating roll. Because of the thermoplastic and tacky nature of rubber a firm seal is made at the points of contact of the two sheets. The resulting product is a composite and corrugated sheet such as designated 37 in Fig. 2. The composite rubber sheet is then heated to about 170° F. by any suitable means such as the radiant heater 39 shown in Fig. 2, and is maintained at this temperature for about 15 seconds. This heating causes shrinkage and relieves the rubber of strains induced in it by any means such as milling, calendering and the like. The shrunk composite sheet so made is wound into a bundle, the corrugations forming tubular spaces throughout the bundle parallel to the axis of the bundle giving somewhat the effect of a honeycomb, as shown at 41 in Fig. 2, or 11 in Fig. 1. The bundle is then immersed in liquefied hydrogen chloride at —85° C. which quickly penetrates into the spaces and into the rubber throughout the bundle. The bundle of rubber is completely converted into a compact, porous mass of amorphous rubber hydrochloride in less than five minutes, the rubber hydrochloride mass being corrugated similar to the rubber. The mass is then removed from the liquefied hydrogen chloride, drained, the excess hydrogen chloride removed by evacuation, and the mass washed. The mass is in such compact form that it may readily be shredded into a finely divided state suitable for dissolving or molding.

It will be understood that the preshrunk rubber may be reacted as separate sheets or in bundles When bundles are used, the bundles are preferably made into roll form as illustrated in the drawings. However, it is apparent that a plurality of composite sheets may be laid on each other and secured together to form a flat bundle, the corrugations forming a honeycomb of tubes with axes running parallel to the surface plane of the sheets. Hydrogen chloride or other reagent is circulated through the spaces and reacts with the rubber forming a rubber hydrochloride bundle of the same general form as the rubber bundle.

My invention is particularly suitable for reactions between rubber and hydrogen chloride. Bundles or sheets in which the sheets are free of strain, however, may also be used for reacting rubber with chlorine, boron trifluoride, etc., and also for reacting rubber-like polymerized chloroprene (neoprene) with chlorine, and for reacting other plastic material with reagents, particularly such reagents as effect an exothermic reaction.

While there have been shown and described certain embodiments of the invention, it is to be understood that it is capable of many modifications. Changes, therefore, may be made without departing from the spirit and scope of the invention as described in the appended claims, in which it is the intention to claim all novelty inherent in the invention as broadly as possible, in view of the prior art.

I claim:

1. The method of forming a bundle of rubber particularly adapted for producing rubber derivatives by exothermal reaction with fluid reagents, which comprises passing sheets of rubber between rolls, one roll of which is a corrugating roll to form a composite sheet comprising a corrugated sheet and a flat sheet, shrinking said composite sheet after it leaves said rolls while maintaining said sheet in a loose condition so that it is free to shrink, said shrinking being carried out by heating at least the flat sheet of said composite sheet, and winding said composite sheet into a roll.

2. The method of forming a bundle of rubber particularly adapted for producing rubber derivatives by exothermal reaction with fluid reagents, which comprises passing sheets of rubber between a toothed roll and a smooth roll so as to form a composite sheet comprising a corrugated sheet attached to a flat sheet, allowing the composite sheet to sag after it leaves the rolls, heating said composite sheet so as to cause substantial shrinkage of at least said flat sheet, and winding the composite sheet into a roll.

HENRY F. IRVING.